United States Patent [19]

Storms

[11] 3,993,142
[45] Nov. 23, 1976

[54] TREE SEEDLING HARVESTER

[75] Inventor: James G. Storms, Garfield, Wash.

[73] Assignee: J. E. Love Company, Garfield, Wash.

[22] Filed: Aug. 8, 1975

[21] Appl. No.: 603,042

Related U.S. Application Data

[62] Division of Ser. No. 506,292, Sept. 16, 1974, Pat. No. 3,964,550.

[52] U.S. Cl. .............................................. 171/101
[51] Int. Cl.² ......................................... A01D 33/00
[58] Field of Search .............. 171/61, 62, 101, 124, 171/134

[56] References Cited
UNITED STATES PATENTS

| | | | |
|---|---|---|---|
| 2,629,216 | 2/1953 | Ruetenik | 171/134 X |
| 3,616,861 | 11/1971 | Bettencourt | 171/101 |
| 3,693,721 | 9/1972 | Arnold et al. | 171/61 |

*Primary Examiner*—Russell R. Kinsey
*Attorney, Agent, or Firm*—Graybeal, Barnard & Uhlir

[57] ABSTRACT

A mobile device for harvesting tree seedlings includes means for subsurface cutting to separate and loosen from the surrounding ground the body of earth adjoining the roots of the tree seedlings. The movement and relative position of the earth separating means enables it to efficiently sever the roots of the tree seedlings from the surrounding ground while allowing only a minimum amount of earth to adhere to the roots of the seedlings as they are removed. A plurality of paired gripper belts remove the loosened seedlings by lifting them upwardly and rearwardly relative to the ground, each pair of gripper belts having male-female intercoupled gripping surfaces which minimize damage to the stems of the seedlings. Disposed below the gripper belts are a plurality of elongated root beater means adapted to move in a transverse oscillatory manner to agitate the roots and remove the earth adhering thereto without damaging the seedlings. A drive linkage mechanism controls the movement of the root beater means and balances the forces resulting therefrom to substantially reduce vibration in the harvester. Finally, an improved sheave structure for the gripper belt drive mechanism enables worn-out bearings to be readily replaced without replacing the entire sheave structure.

3 Claims, 12 Drawing Figures

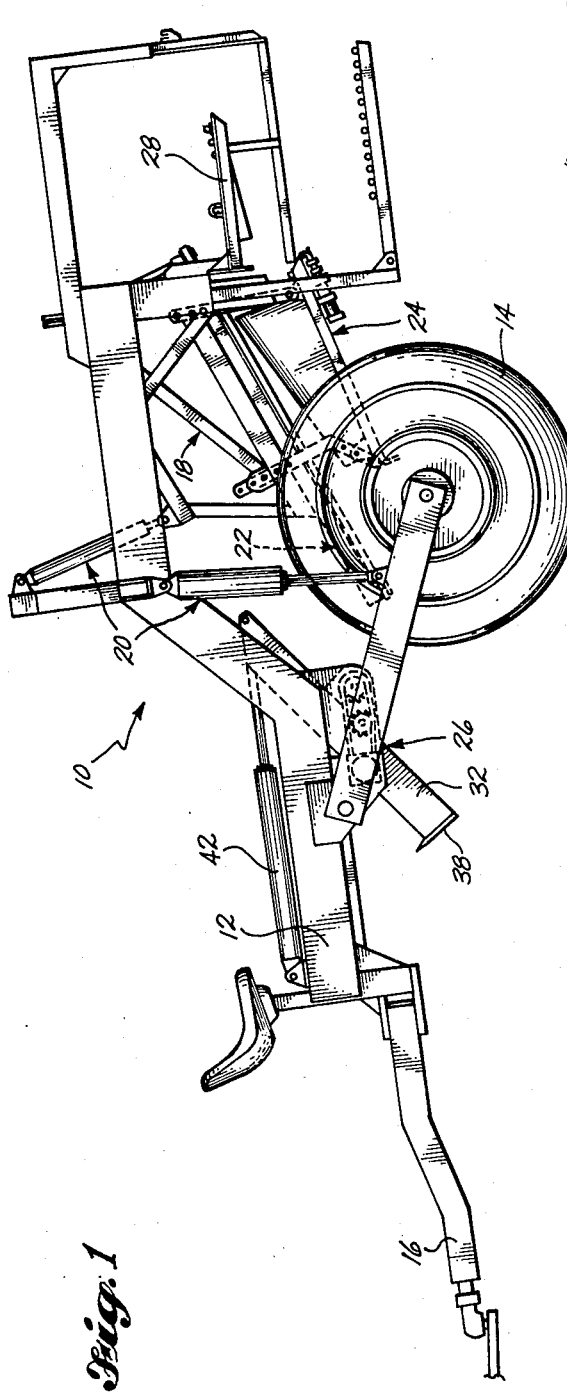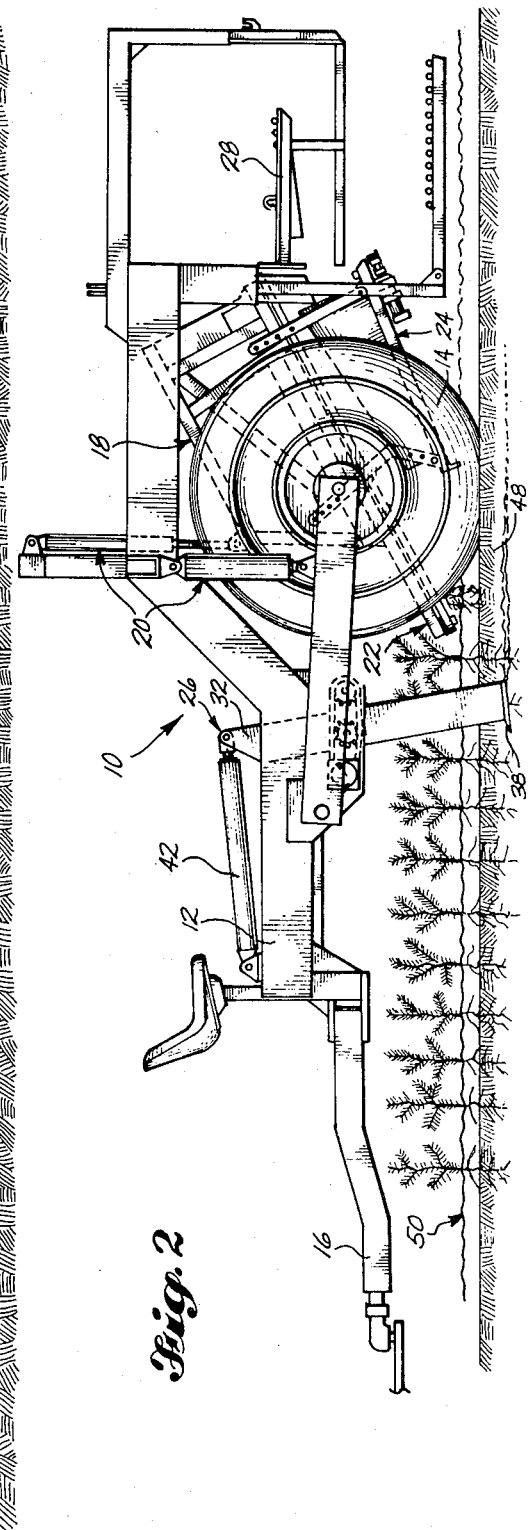

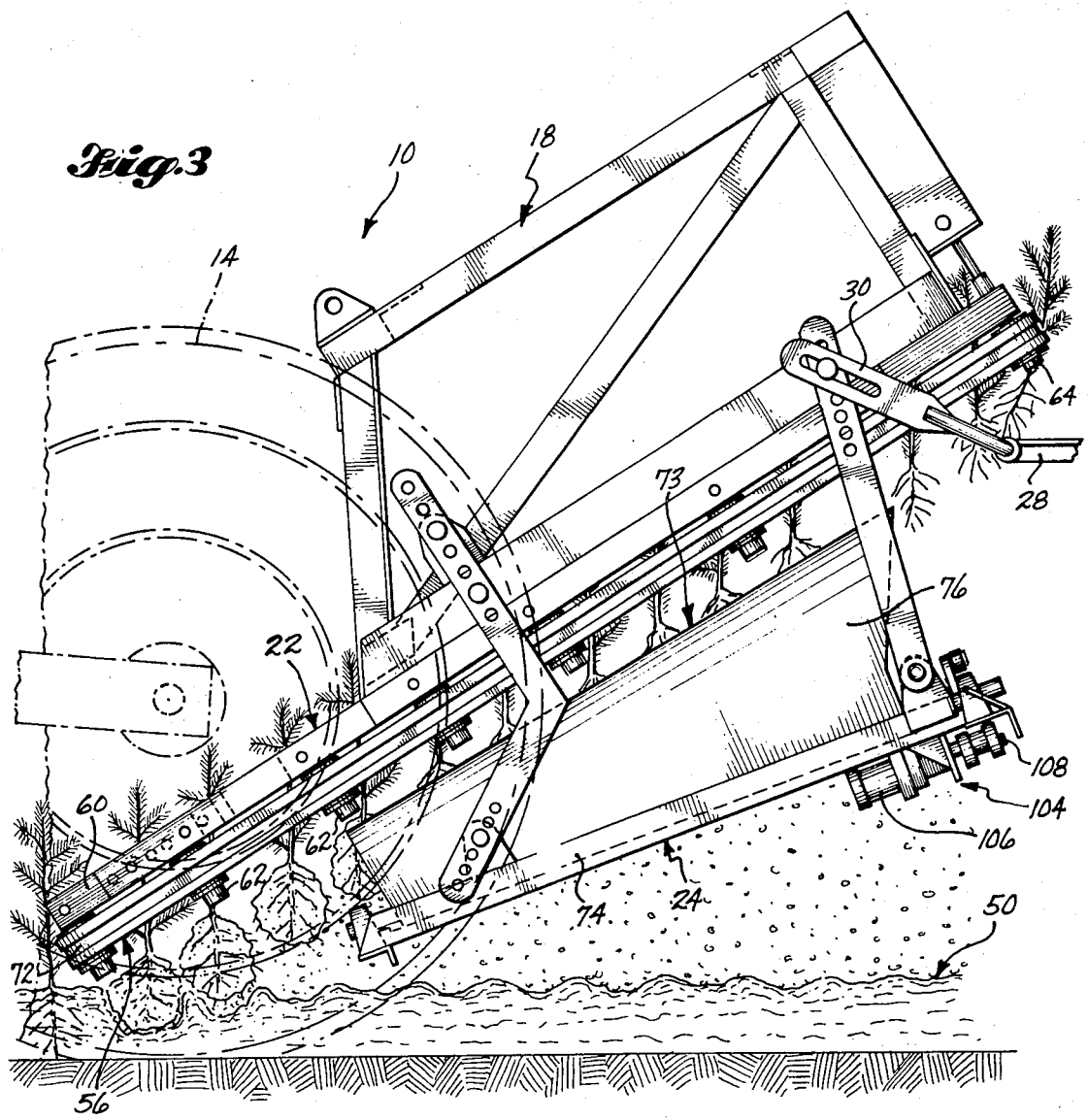

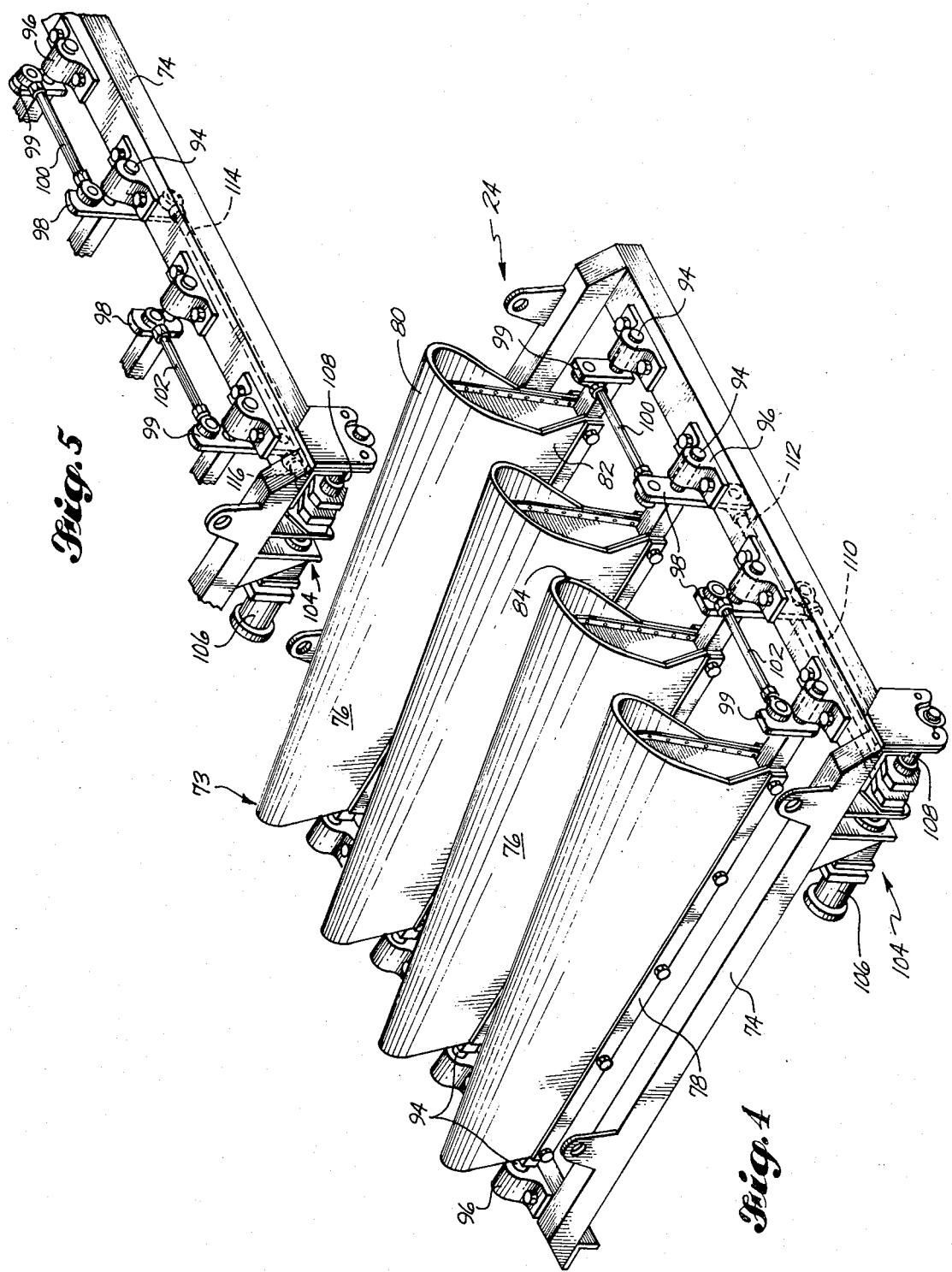

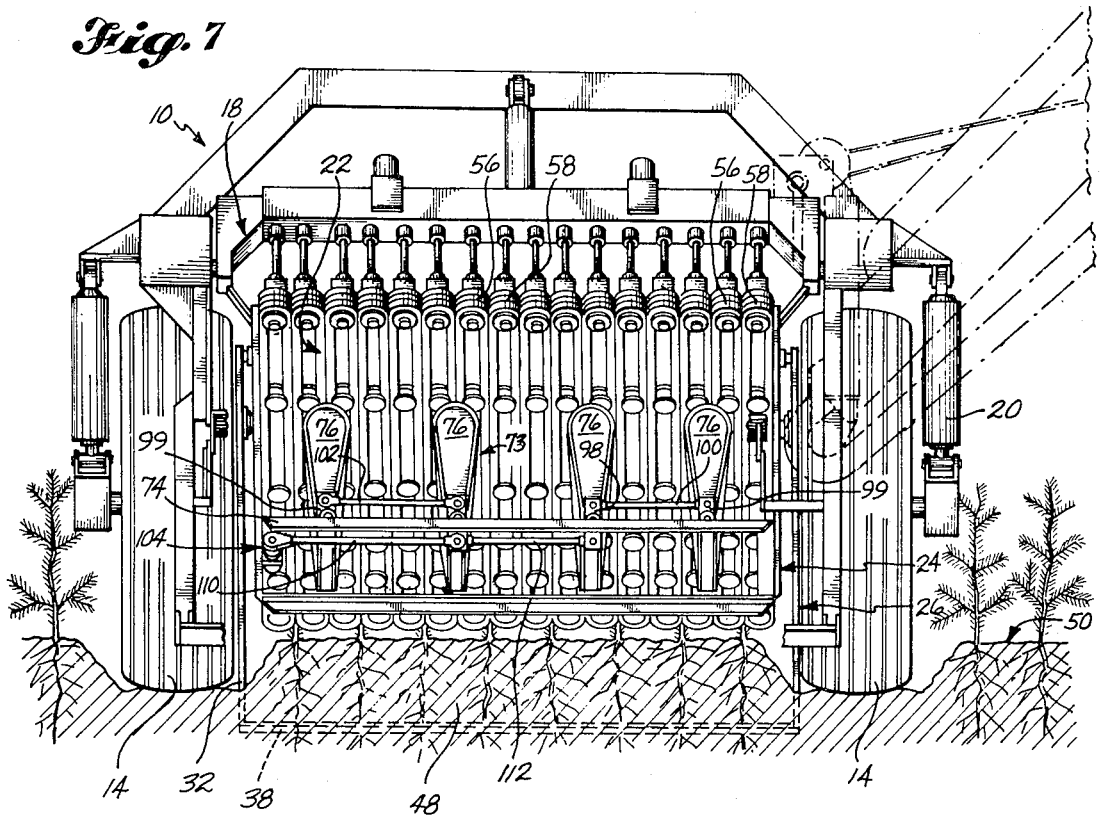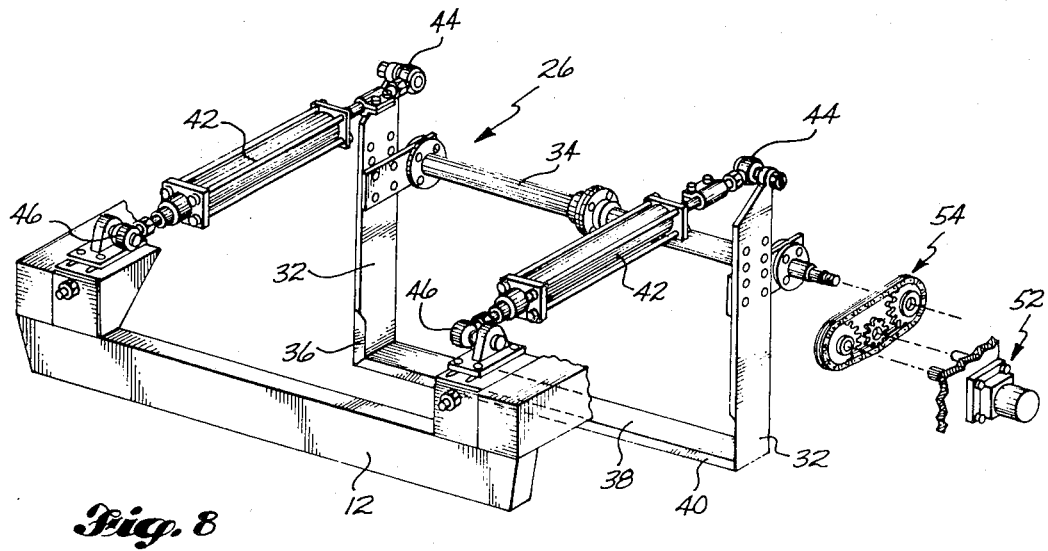

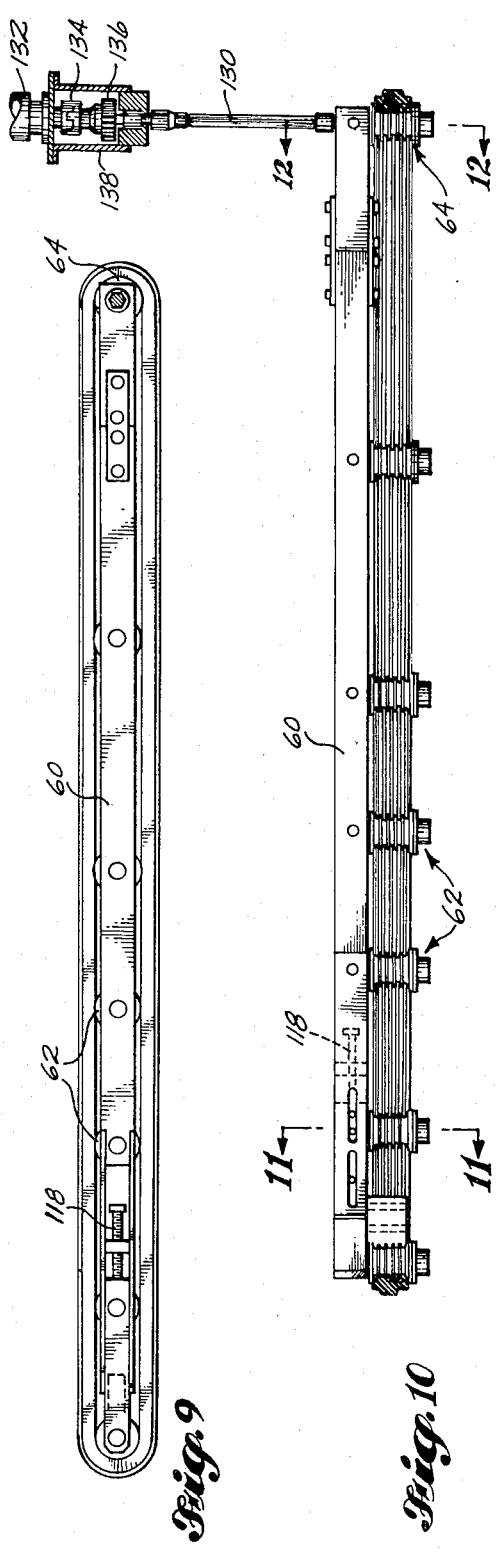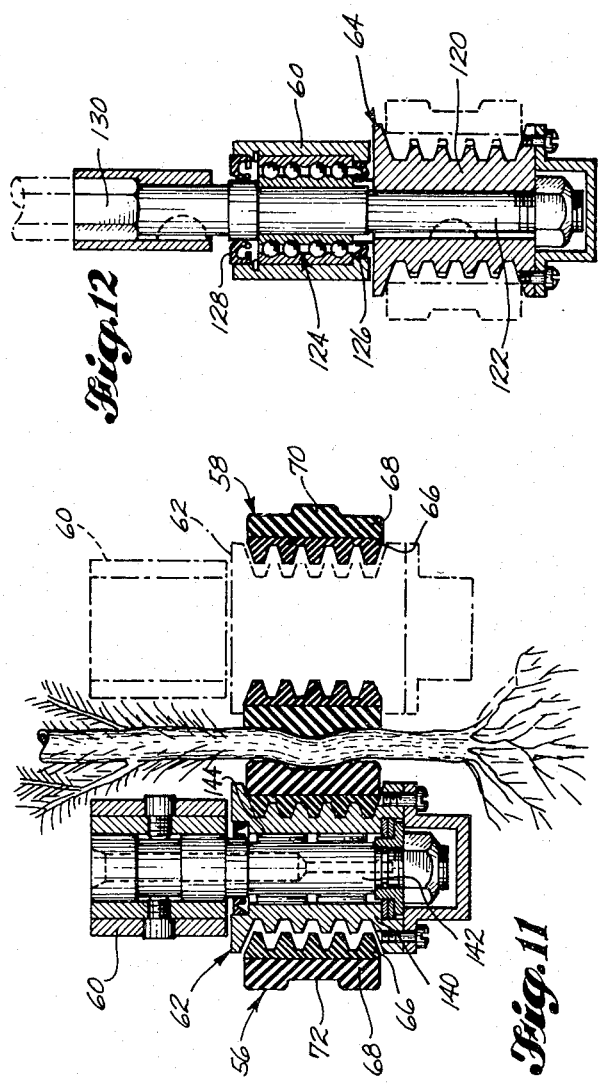

TREE SEEDLING HARVESTER

CROSS-REFERENCE TO RELATED APPLICATION

This is a division of my copending application Ser. No. 506,292, filed Sept. 16, 1974, now U.S. Pat. No. 3,964,550, and entitled Tree Seedling Harvester.

BACKGROUND OF THE INVENTION

1. Field of the Invention

This invention relates to a device for harvesting plants that are deeply and/or complexly rooted in the ground, and more particularly to a device for harvesting tree seedlings which are intended for replanting in the ground to undergo further growth thereafter. Specifically, the present invention relates to an improved tree seedling harvester which increases the efficiency and effectiveness of the harvesting operation and results in harvested tree seedlings which are cleaner and undamaged.

2. Description of the Prior Art

Plants which have deep and/or complex root systems are not readily susceptible to machine harvesting due to the problem of separating the roots of the plants from the body of earth contiguous thereto. This problem is particularly acute when the plants are intended for replanting to undergo further growth, as in the case of nursery grown tree seedlings intended for replanting on a tree farm or for reforestation.

Prior to the invention disclosed in U.S. Pat. No. 3,693,721, issued on Sept. 26, 1972, to Eugene W. Arnold et al, most tree seedlings had been harvested by hand for the reason that techniques were unavailable whereby the seedlings could be machine harvested without unduly damaging the plants, particularly the root structures. The tree seedling harvester disclosed in the aforementioned patent, the contents of which are herewith specifically incorporated by reference, considerably improved the methods and techniques for machine harvesting tree seedlings. However, certain inadequacies and problems with the disclosed harvester were eventually discovered. One such problem was that too much earth adhered to the roots of the seedlings as they were lifted from the ground, thereby requiring considerable agitation to the root structures to remove the earth. Such excess agitation can cause damage to the root system. Another problem was that the mechanism utilized to shake or agitate the roots caused considerable vibration in the harvester. An additional inadequacy was that the gripper belts which lift the tree seedlings from the ground required too much "squeeze" force against the stems of the seedlings in order to hold them between the belts, and this can also damage the seedlings. Finally, the design of the sheaves which carry the gripper belts was such that replacement of an entire sheave structure was necessary whenever the bearings therein became worn, and this is very time consuming and costly.

SUMMARY OF THE INVENTION

It is one object of the present invention to provide a tree seedling harvester having an improved subsurface cutting means disposed to sever the roots of the tree seedlings from the surrounding ground yet minimize the amount of earth which is lifted upwardly along with the severed tree seedlings.

To achieve this and other objects and in accordance with the present invention, a mobile device for harvesting tree seedlings is provided having a cutter blade insertable in the ground to sever the body of earth adjoining the roots of the tree seedlings from the surrounding ground. While the cutter blade is being drawn through the ground, it is simultaneously moving in a vertical cyclic manner to vibrate the root contiguous earth and reduce its cohesion to the roots. The cutter blade is secured to the lowermost ends of a pair of spaced hanger means. Each of the uppermost ends of the spaced hanger means is pivotally connected to one end of an extensible lift means adapted to raise and lower the cutter blade yet maintain the blade in its lowered cutting position when it is being drawn through the ground and moving in the aforementioned vertical cyclic manner.

BRIEF DESCRIPTION OF THE DRAWINGS

FIG. 1 is a side elevational schematic of a tree seedling harvester of the present invention in an upright position for traveling.

FIG. 2 is a side elevational schematic of the tree seedling harvester of FIG. 1 but in a downward position during the process of harvesting.

FIG. 3 is an enlarged side elevational view of the conveyor means frame, root beater means and gripper belt assembly, illustrated in the process of harvesting seedlings.

FIG. 4 is an enlarged perspective view of one embodiment of the root beater means assembly, showing the preferred drive linkage for the root beater means.

FIG. 5 is an enlarged cut-away perspective view of another embodiment of the drive linkage assembly for the root beater means.

FIG. 7 is a rear elevational view of a tree seedling harvester of the present invention while in the process of harvesting, illustrating the interrelationship between the gripper belts, root beater means assembly and tree seedlings.

FIG. 8 is a perspective fragmentary view, with some parts exploded, of the cutter blade assembly and lift control system therefor.

FIG. 9 is a top plan view of a gripper belt carrier bar with a gripper belt mounted therebelow.

FIG. 10 is a side elevational view of the carrier bar of FIG. 9, with some parts in section, and illustrating a portion of the drive mechanism for the gripper belt.

FIG. 11 is a cross-sectional view of an idler pulley taken substantially along line 11—11 of FIG. 10 and showing the interrelationship between the cross-sectioned idler pulley and the idler pulley carried by an adjacent carrier bar.

FIG. 12 is a cross-sectional view of the drive pulley for the gripper belts taken substantially along line 12—12 of FIG. 10.

DETAILED DESCRIPTION OF THE INVENTION

Figure 6:
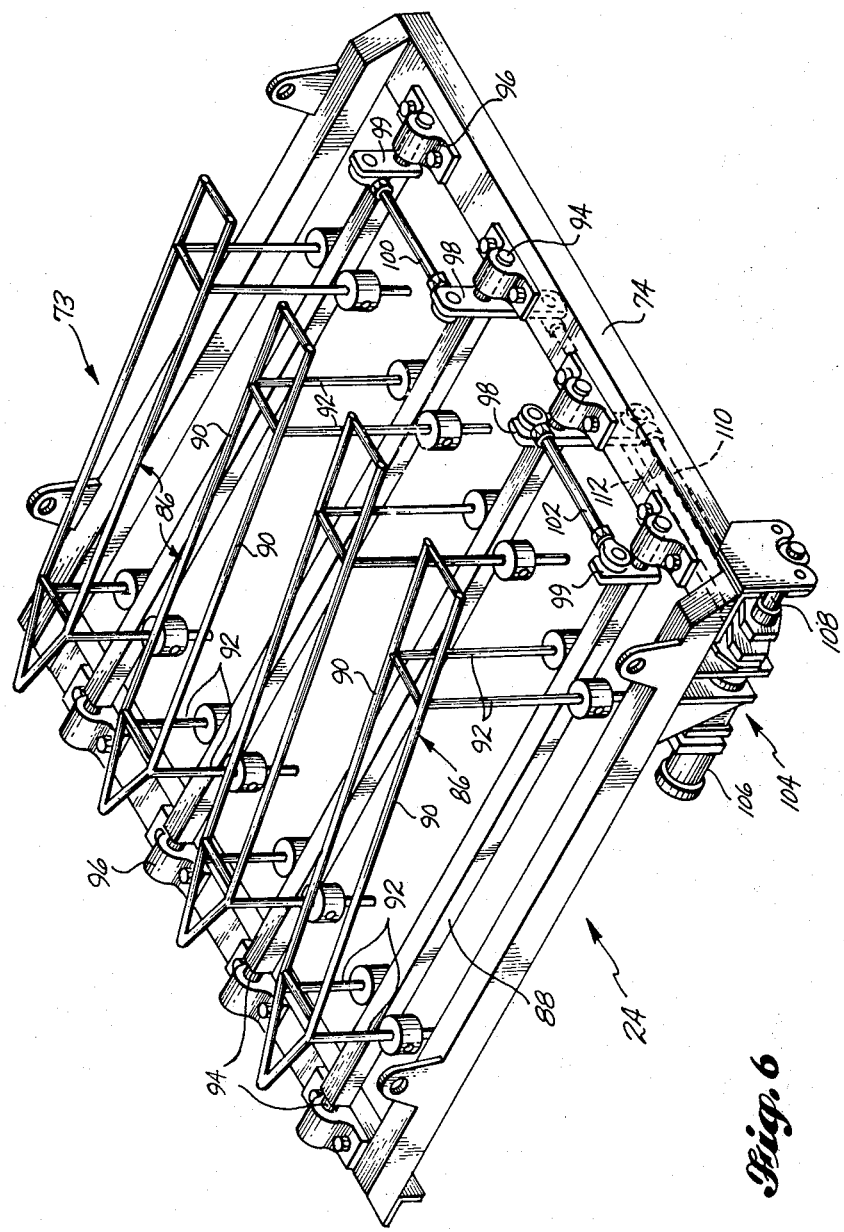
FIG. 6 is an enlarged perspective view of another embodiment of the root beater means assembly.

Referring to FIGS. 1, 2, 3 and 7, there is shown a mobile tree harvesting device 10 having a main frame carriage 12 carried by ground engaging wheels 14. The device is towed behind a wheeled tractor or other engine driven vehicle (not shown) by means of a hitch 16. Conveying means frame 18 is located toward the rearward portion of carriage 12 and is mounted thereto by lifting means 20. Lifting means 20 is preferably an hydraulic control device of conventional design and enables the conveyor frame 18 to be carried above the ground for travel to and from the harvesting field as shown in FIG. 1 and to be lowered toward the ground surface for harvesting operations, as shown in FIG. 2. Mounted on the conveying means frame 18 is a gripper belt assembly 22 and a root beater means assembly 24. An earth severing mechanism 26 is secured to carriage 12 forward of conveying means frame 18. As illustrated by the figures, when device 10 is being towed forwardly in a harvesting position, earth severing mechanism 26 separates and loosens from the surrounding ground the body of earth adjoining the roots of the growing tree seedlings. The gripper belt assembly 22 then grabs the tree seedlings by their stem portions and lifts them upwardly and rearwardly, directing the roots of the seedlings through the root beater means assembly 24 which agitates the roots and removes the earth adhering thereto. The tree seedlings are then deposited by the gripper belt assembly onto a platform 28 wherein they are gathered and stacked. As shown in FIG. 3, a trip rod 30 is preferably provided at the rearward end of gripper belt assembly 22 to insure that the tree seedlings are deposited flatly and in a uniform manner on platform 28.

Referring in more detail to the earth severing mechanism 26, as best illustrated in FIGS. 1, 2, 7 and 8, a pair of spaced, essentially parallel support arms 32 are pivotally supported on an eccentric shaft 34 secured to carriage 12, shaft 34 being transverse to the longitudinal axis of device 10. Support arms 32 are positioned to depend from carriage 12 with the lowermost end portions of each leg adapted to extend into the ground on either side of a series of tree seedlings. To achieve this, the lower forward edge portion 36 of each arm 32 is preferably beveled to present a sharp edge to the ground. Interconnecting the lowermost ends of support arms 32 is a cutting blade 38 having a beveled forward edge 40 to cut through the ground during harvesting. Pivotally secured to the uppermost end of each arm 32 is an extensible lift means 42, preferably an hydraulic cylinder. Each cylinder 42 is connected at one end to the upper end of an arm 32 by a ball and socket joint 44. The other ends of cylinders 42 are pivotally secured to carriage 12 by ball and socket joints 46. In preferred form, as shown in FIGS. 1 and 2, hydraulic cylinders 42 are positioned on carriage 12 fowardly of shaft 34 and support arms 32. In this manner, when cylinders 42 are fully extended, support arms 32 are pivoted upwardly about shaft 34 to maintain blade 38 above the ground surface. When hydraulic cylinders 42 are completely retracted, arms 32 are pivoted downwardly to engage hanger portions 36 and blade 38 with the ground when device 10 is in operation. Due to the forward position of cylinders 42 relative to arms 32 and blade 38, blade 38 severs the ground 48 adjoining the seedlings at a point immediately forward of gripper belt assembly 22. This enables the assembly to pick up the seedlings immediately after severing, thereby minimizing the amount of earth adhering to the seedling roots due to the fact that the vibrated earth has not had time to settle, as described below.

When device 10 is in the process of harvesting, cutting blade 38 and the lower portions 36 of arms 32 slice and plow through the ground about the root portions of the tree seedlings and effectively sever the body of earth 48 contiguous to and adjoining the roots of the seedlings from the surrounding ground 50. In addition, in order to more readily remove the tree seedlings from the ground with less damage to their roots, the adjoining earth 48 is preferably subjected to agitation and fluidization by imparting a vertically oriented vibratory motion to the cutting blade 38 as it moves forwardly through the ground. This is achieved by rotating eccentric shaft 34 with the use of drive mechanism 52 and gear assembly 54, thereby moving arms 32 in an eccentric manner at the points wherein they are journaled about shaft 34 which imparts a vertically orientated vibratory motion to blade 38. The ball and socket joints 44, 46 of cylinders 42 enable the arms 32 and blade 38 to move in such a manner while being maintained in a proper orientation for cutting.

The gripper belt assembly 22, as shown in detail in FIGS. 3, 7 and 11, comprises a plurality of paired, endless gripper belts 56 and 58 disposed to move in relation to conveying means frame 18 over an elongated path inclined to the surface of the ground 50. Each pair of gripper belts 56, 58 engage a tree seedling therebetween at a point adjacent the relatively lower forward end of the elongated path and lift the seedling to a point adjacent the relatively upper rearward end of the path. Preferably, the tree seedlings are harvested eight rows at a time thereby requiring eight pairs of gripper belts on device 10, although the number of rows of tree seedlings harvested at a time and the corresponding number of paired gripper belts may be varied according to the needs of the particular harvesting operation.

Disposed immediately above and parallel with each gripper belt is a carrier bar 60. Carrier bar 60 is mounted to conveying means frame 18 and has depending therefrom a plurality of idler pulleys 62 and a drive pulley 64. Each gripper belt is mounted to be carried by and travel about the pulleys 62, 64. The carrier bars 60 are positioned relative to each other so that the gripping surfaces of each pair of gripper belts are biased relatively toward one another by non-yieldable backing portions 66 which engage the pulleys 62, 64. The gripping surface 68 of each gripper belt is preferably fabricated from an elastomeric material, such as rubber, which accommodates the tree seedlings by undergoing elastic deformation between the backing portions of the paired belts. In preferred form, the gripping surface 68 of one belt of each pair of belts includes a longitudinal, centrally disposed male coupling portion 70 which projects outwardly therefrom and extends the entire length of the belt. The gripping surface 68 of the other belt of each pair of belts includes a similarly disposed, longitudinal female recessed coupling portion 72 which also extends the entire length of the belt and engages the male coupling portion of its oppositely disposed paired belt. In this manner, each tree seedling is accommodated between the paired belts by elastic deformation of the gripping surface and is bent along its stem portion between the male-female coupling portions of the paired belts. This bending of the tree seedling stems enables a considerable reduction in the amount of bias or "squeeze" force imposed upon the seedling to prevent it from slipping out from between the belts. This reduction of bias force permits the tree seedling harvester device to grip and lift the seedlings yet prevents unnecessary damage to the stems of the seedlings, for bending of the flexible seedling stem will not harm the plant.

Since the rows of tree seedlings are normally planted relatively close together, it is preferred that the pairs of gripper belts be disposed contiguous to each other. To achieve this, the male and female gripper belts are alternated along the entire bank of paired belts such that a male belt engages its paired female belt when lifting a tree seedling and engages the female belt of the adjacent pair of belts on its return. In this manner, an entire bank of intercoupled, alternating male-female gripper belts is obtained, and this provides considerable stability to gripper belt assembly 22.

Referring now to FIGS. 3–7, the root beater means assembly 24 is positioned immediately below the bank of paired gripper belts 56, 58 such that the roots of the tree seedlings pass between a plurality of elongated root beater means 73 adapted for oscillatory movement in a direction substantially transverse to the longitudinal axis of device 10, the root beater means 73 preferably pivoting back and forth along their longitudinal base edges. When the roots of each tree seedling pass to either side of one of the root beater means 73, the oscillating root beater means 73 strike the roots of the seedlings to remove any earth which has adhered thereto.

In the embodiment illustrated in FIGS. 3, 4 and 7, the root beater means assembly 24 includes a support frame 74 which is secured to conveying means frame 18. The elongated root beater means 73 comprise beater paddles 76 which are pivotally mounted along their lowermost longitudinal base edges 78 to support frame 74 thereby positioning beater paddles 76 between frame 74 and the gripper belts 56, 58. Each beater paddle 76 preferably has a wide upper portion 80 and a narrow lower portion 82 and increases in height toward the relatively rearward end of frame 74 so that the roots of the seedlings come into gradual contact with the oscillating beater paddles. In addition, each beater paddle 76 is covered with a solid, elastomeric-type material 84, such as rubber, to form relatively resilient side portions for contact with the roots of the tree seedlings. In this manner, the root systems of the seedlings are not damaged by striking a hard solid surface.

In an alternative form of the root beater means 73 illustrated in FIG. 6, the root beater means comprise a plurality of elongated root beater frames 86. Each beater frame 86 has a longitudinal lowermost base edge portion 88 which is pivotally secured to support frame 74. Longitudinal rod portions 90 are disposed above base edge portion 88 and secured thereto by vertical connecting rods 92. Like the root beater paddle 76, the root beater frame 86 increases in height toward the relatively rearward end of frame 74 to enable the roots of the seedlings to come into gradual contact with the oscillating root beater frame 86. Unlike the beater panel 76, however, the beater frame 86 is not covered with an elastomeric material. Instead, the longitudinal rods 90 act as the side portions for contact with the roots of the seedlings. When the rods 90 strike the roots of the seedlings, the roots tend to fan around rods 90 thus spreading the roots and loosening the soil mass which is adhered thereto. The roots are not damaged, however, by contact with rods 90 inasmuch as a hard, solid side wall is not presented to the roots, the roots being free to partially wrap around rods 90 when struck thereby. In addition, the frame structure of root beater frames 86 provide strength advantages due to the reduced weight and a resulting reduction of mass at the extremes of the radii of the pivoting beater frames 86.

In both of the above described embodiments, the longitudinal base edge of each root beater means 73 is secured at either end to longitudinal shafts 94 which in turn are pivotally maintained within shaft housings 96 mounted on frame 74. In preferred form, there are four adjacently spaced, elongated root beater means 73 secured to frame 74 in the aforementioned manner. Journaled about shafts 94 at the rearmost end of the root beater means 73 and frame 74 are linkage plates 98, 99. Interconnecting the linkage plate 98 of each inwardly disposed root beater means 73 to the linkage plate 99 of the adjacent outwardly disposed root beater means 73 are two connecting shafts 100 and 102, thus providing two pairs of interconnected root beater means 73. A drive means 104 is secured to frame 74 and is interconnected with the linkage plates 98, 99 to impart an oscillatory pivotal motion to the root beater means 73. The drive means 104 includes motor means 106 adapted to rotate a double eccentric shaft 108. The two eccentric lobe portions (not shown) of the shaft 108 are longitudinally spaced apart along shaft 108 and circumferentially oppositely disposed.

In the preferred linkage assembly illustrated in FIGS. 4 and 6, a first drive rod 110 is secured at one end about one of the eccentric lobe portions of shaft 108 and is connected at its other end to the linkage plate 98 of one of the inwardly disposed root beater means 73. A second drive rod 112 is secured at one end about the second eccentric lobe portion of shaft 108 and is connected at its other end to the linkage plate 98 of the other inwardly disposed root beater means. In this manner, the pair of root beater means 73 interconnected by connecting shaft 100 are oscillated transversely in one direction while the other pair of root beater means 73 interconnected by shaft 102 are oscillated simultaneously in an opposite transverse direction due to the opposite positionings of the eccentric lobe portions about the circumference of shaft 108. Thus, the two pair of interconnected root beater means oscillate transversely 180° out of phase with each other which results in considerably reducing the vibration imparted to device 10 by the oscillations of the paired root beater means 73. This arrangement also reduces the stress imposed on shaft 108.

In an alternative embodiment illustrated in FIG. 5, a drive rod 114 is secured at one end about one of the eccentric lobes of shaft 108 and at its other end to the linkage plate 98 of the furthest inwardly disposed root beater means 73. A second drive rod 116 is secured at one of its ends about the other eccentric lobe of shaft 108 and is connected at its other end to the linkage plate 99 of the nearest outwardly disposed root beater means. In this manner, the same opposed oscillatory transverse motion is imparted to the paired root beater means 73 as in the previous embodiment, although the forces imposed on shaft 108 are somewhat different from the embodiment illustrated in FIGS. 4 and 6. In any event, any manner can be utilized of connecting double eccentric shaft 108 to linkage plates 98 and 99 to impart the above described oscillatory motion to the root beater means 73.

It will be noted that where eight rows of seedlings are harvested simultaneously, the alignment of the four root beater means 73 relative to the bank of paired gripper belts 56, 58 is preferably such that the six interior rows of seedlings pass between the four root beater means 73, two rows each between adjacent beater means 73, and the outer two rows of seedlings pass to the outside of the two outwardly disposed root beater means 73, as illustrated in FIG. 7. Such an alignment enables the roots of each seedling to come into direct contact with the side portion of at least one root beater means 73, thereby insuring that the roots will be adequately agitated.

Turning to FIGS. 9–12, each carrier bar 60 preferably has a belt tightening nut 118 which enables the gripper belt to be firmly secured about the idler and drive pulleys 62, 64 by lengthening bar 60 through the tightening of nut 118. To move each belt about pulleys 62, drive pulley 64 preferably includes an essentially cylindrical sheave 120 secured about a pulley shaft 122, the outer surface of sheave 120 having circumferential grooves to conform to the shape of the nonyieldable backing portion of the gripper belt. Surrounding shaft 122 within the body of carrier bar 60 is a bearing unit 124 with seals 126 and 128. Pulley shaft 122 passes through carrier bar 60 and is interconnected to an hexagonal drive shaft 130 immediately thereabove. An hydraulic motor 132 rotates shafts 130 and 122 and is connected to shaft 130 by coupling 134 and gear means 136 contained within a housing 138.

As the drive pulley 64 of each carrier bar 60 is turned by motor 132, the gripper belt travels about idler pulleys 62. To carry the gripper belt, each idler pulley 62 preferably includes an outer, essentially cylindrical sheave 140, a non-rotating shaft 142 disposed within sheave 140 and extending into carrier bar 60, and a plurality of needle bearings 144 which are positioned between shaft 142 and sheave 140. The outer surface of sheave 140 contains circumferential grooves for engagement with the non-yieldable backing portion of the gripper belt. Bearings 144 are disposed within idler pulley 62 rather than within the carrier bar 60, as with the drive pulley 64 arrangement, due to the fact that these bearings 144 have a tendency to become worn. When the bearings are disposed within carrier bar 60, they cannot be readily removed and replaced without taking apart the carrier bar 60 and replacing the entire sheave structure of idler pulley. However, in the present arrangement these bearings may be readily removed and replaced in the field without taking apart the carrier bar 60, thereby saving time and expense. In addition, placing the bearings within the idler pulleys 62 positions them at the point of maximum stress resulting from the traveling of the gripper belt about the pulleys.

As can be seen from the above, the present invention provides for rapid and efficient harvesting of tree seedlings for replanting. The design and configuration of the earth severing mechanism enables the tree seedlings to be readily separated and lifted from the ground yet prevents any considerable amount of earth from being lifted therewith. In addition, the arrangement of the gripper belt assembly and design of the gripper belts enables the tree seedlings to be lifted and conveyed to a receiver without damaging the stems thereof, while the root beater means assembly effectively removes the dirt adhering to the roots of the seedlings yet prevents damage to the fragile root systems. Furthermore, the drive linkage mechanism of the root beater means assembly balances the forces arising from movement of the root beater means to minimize vibration in the harvester and stress on the assembly. Finally, worn bearings in the idler sheaves of the gripper belt assembly can be readily replaced without having to replace the entire idler pulley structure.

It will be understood that the invention may be embodied in other specific forms without departing from the spirit or central characterics thereof. The present examples and embodiments, therefore, are to be considered in all respects as illustrative and not restrictive, and the invention is not to be limited to the details given herein but may be modified within the scope of the appended claims.

What is claimed is:

1. In a mobile device for harvesting tree seedlings including means for subsurface cutting to separate and loosen from the surrounding ground the body of earth adjoining the roots of said seedlings, means for conveying the seedlings to a receiver, means for removing the body of earth adhering to the roots of said seedlings, supporting frame means, and the improvement wherein said means for subsurface cutting comprises a pair of horizontally spaced apart support arms, a transverse support shaft mounted on said frame, connector means attached to said support arms intermediate their ends and including means journaling said support arms for rotation about said support shaft, a transverse cutter blade interconnected between the lowermost end portions of said spaced apart support arms, and double acting cylinder means pivotally connected at one end thereof to the upper ends of said spaced apart support arms and pivotally connected at the second end thereof to said frame, forwardly of said support arms, said double acting cylinder means serving to swing said support arms and the cutter blade carried thereby between an operative position in which the cutter blade is in the ground and a transport position in which said cutter blade is spaced above the ground, and further serving to brace said support arms and said cutter blade when in said operative position.

2. The improvement according to claim 1, wherein the pivotal connections at each end of said double acting cylinder means comprising ball and socket joints.

3. The improvement according to claim 1, wherein said support shaft is an eccentric shaft, and wherein said mobile device includes means for rotating said eccentric support shaft whereby the eccentric nature of the shaft will cause a vertically oriented vibratory motion to be imparted to the support arms and the cutter blade supported thereby.

* * * * *